INVENTORS
ARTHUR B. VIESCAS
ERNEST ELROD
BY
Walter M. Rodgers
ATTORNEY

INVENTORS
ARTHUR B. VIESCAS
ERNEST ELROD
BY
Walter M. Rodgers
ATTORNEY

INVENTORS
ARTHUR B. VIESCAS
ERNEST ELROD

BY *Walter M. Rodgers*
ATTORNEY

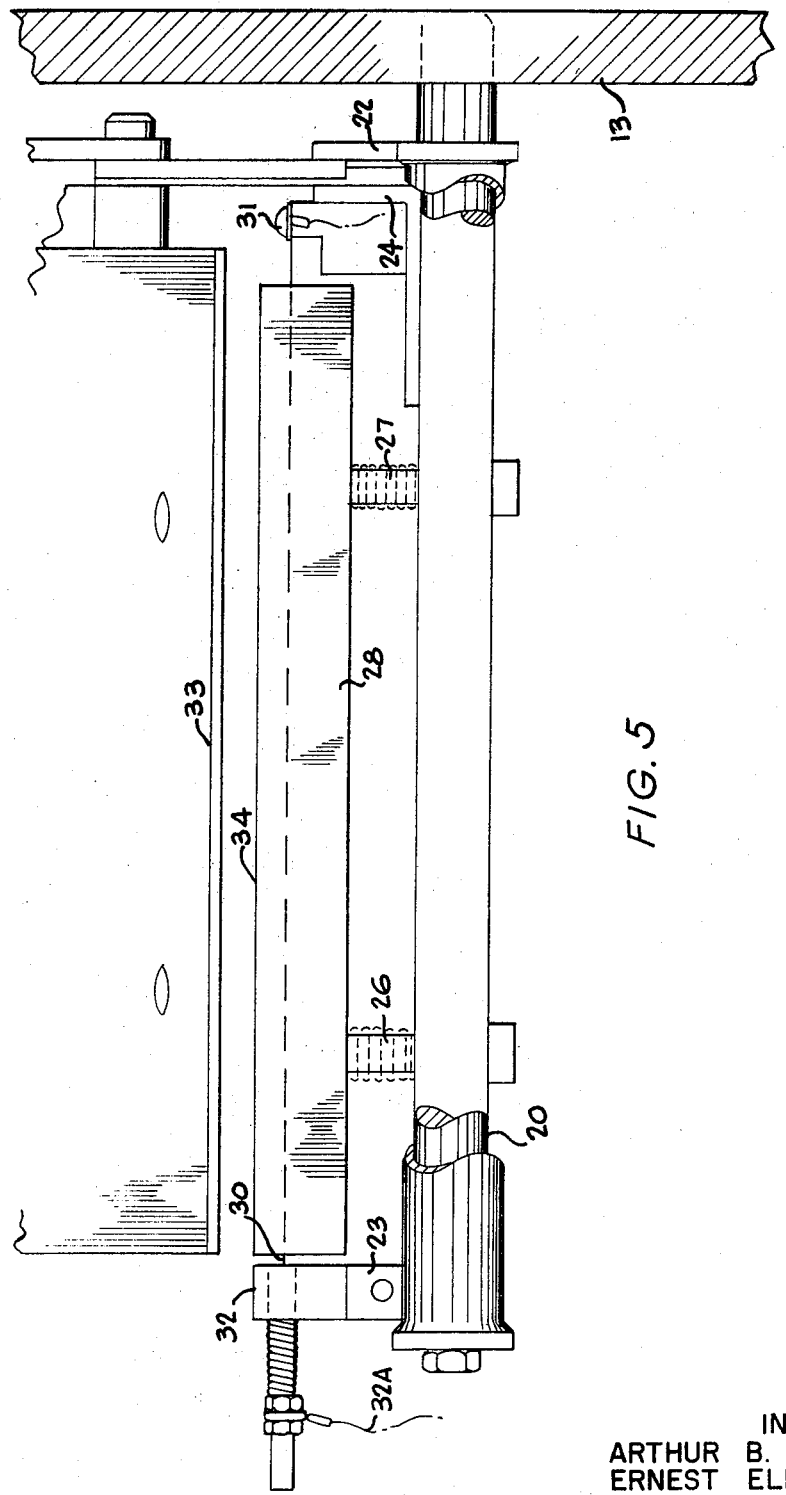

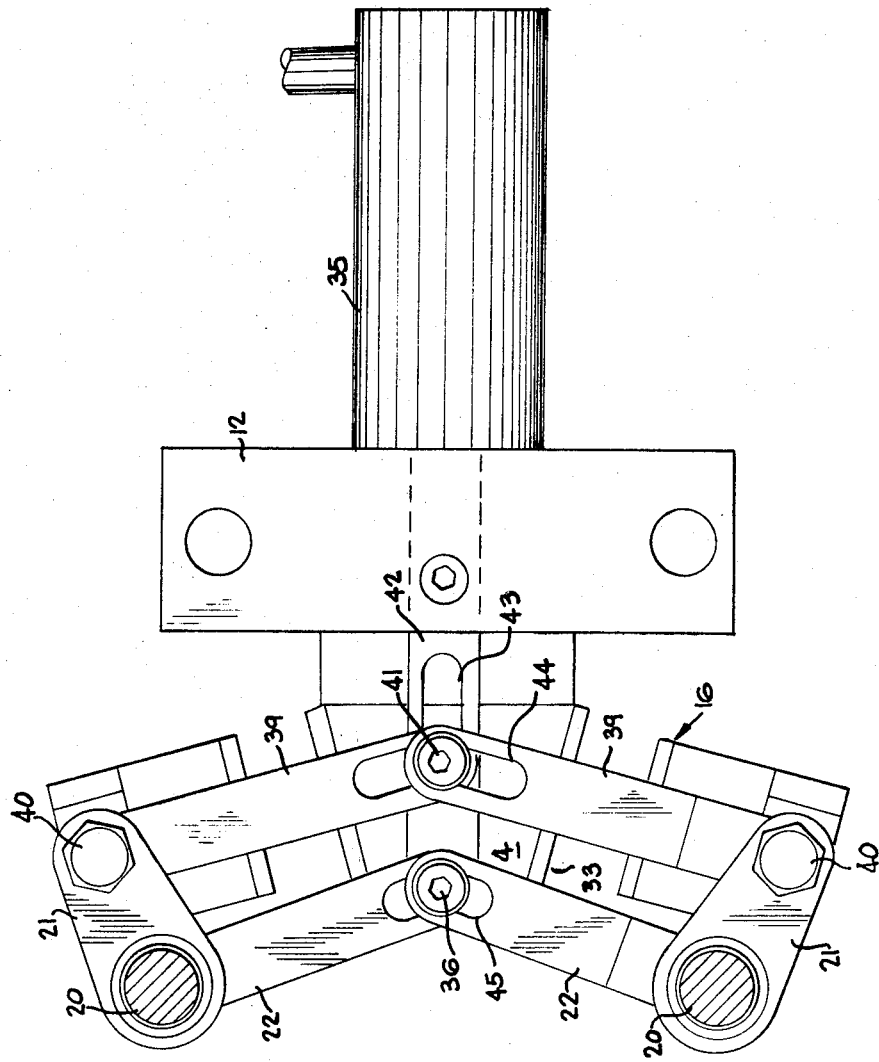

United States Patent Office 3,705,069
Patented Dec. 5, 1972

3,705,069
FILM SPLICING DEVICE
Ernest Elrod, Jonesboro, and Arthur B. Viescas, Decatur, Ga., assignors to The Mead Corporation, Dayton, Ohio
Filed Mar. 5, 1971, Ser. No. 121,313
Int. Cl. B31f 5/00; B37b 31/08; B65h 21/00
U.S. Cl. 156—502                                   8 Claims

ABSTRACT OF THE DISCLOSURE

A reserve film strip is arranged with its leading end wrapped partially about a fixed mandrel and clamped thereto. A strip of supply film is fed to a point of use and immediately alongside the mandrel and adjacent the clamped leading end of the reserve roll and means for bonding the leading end of the reserve strip to the trailing end of the supply strip is disposed adjacent the mandrel and comprises a pressure bar for urging the strips together and an elongated heater element which both seals the adjacent ends of the two rolls together and severs the surplus ends. The bonding means including the pressure bar and heater element are sequentially urged into engagement with the juxtaposed strips by suitable motive means such as a fluid motor.

---

For forming packages such as shrink film packages, for example, a strip of film is supplied to a machine such as that disclosed and claimed in United States patent application Ser. No. 31,688 filed Apr. 24, 1970 now Pat. No. 3,629,990. When a roll of such film strip approaches depletion, it is necessary to replace such depleted roll with a reserve roll and toward this end, it is necessary to splice the trailing end of the depleted roll with the leading end of a reserve roll so that the packaging process may continue. Of course the so-called reserve roll is replaced in like fashion after it is depleted.

According to the invention a mandrel is fixedly mounted adjacent the point of use of a film strip and the leading end of a reserve film strip is partially wrapped about the mandrel and secured thereto. A supply film strip is fed alongside the mandrel and immediately adjacent the clamped leading end of the reserve film strip and bonding means is disposed adjacent the two strips and arranged to urge the two strips into close face-to-face contacting relationship with each other and into contact with the mandrel. After the trailing end of the supply strip is bonded to the leading end of the reserve strip and the superfluous end portions severed, the reserve strip is fed to a point of use and takes the place of the supply strip. Thereafter the cycle is repeated when the so-called reserve film strip becomes depleted.

Figure 1:
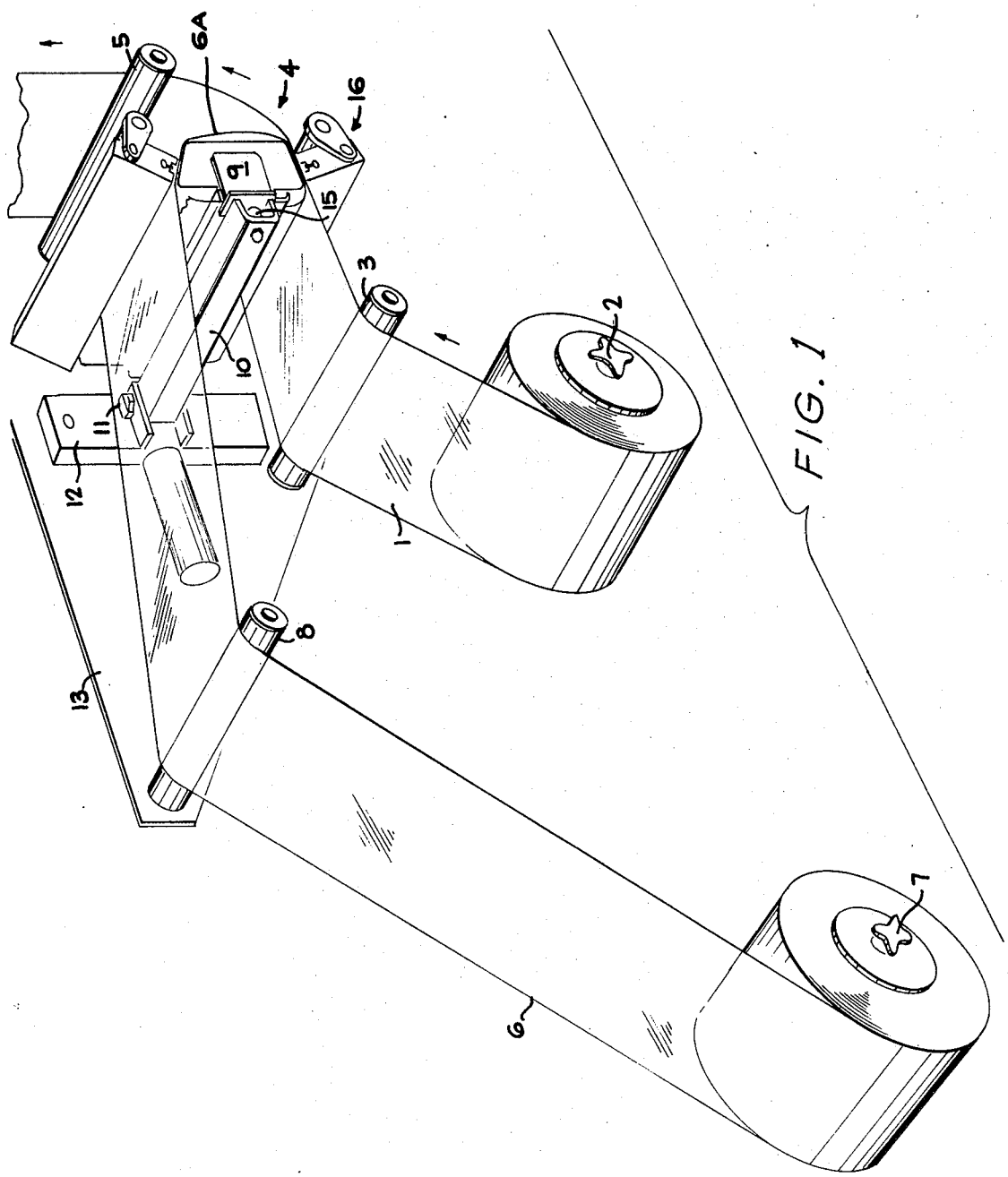
Figure 2:
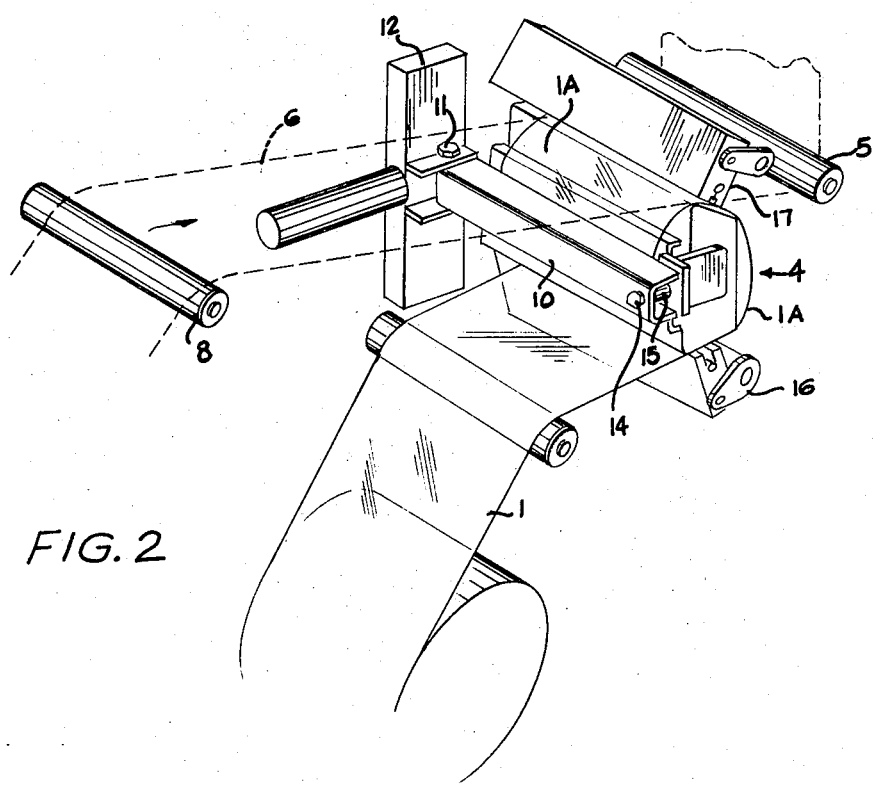
Figure 3:
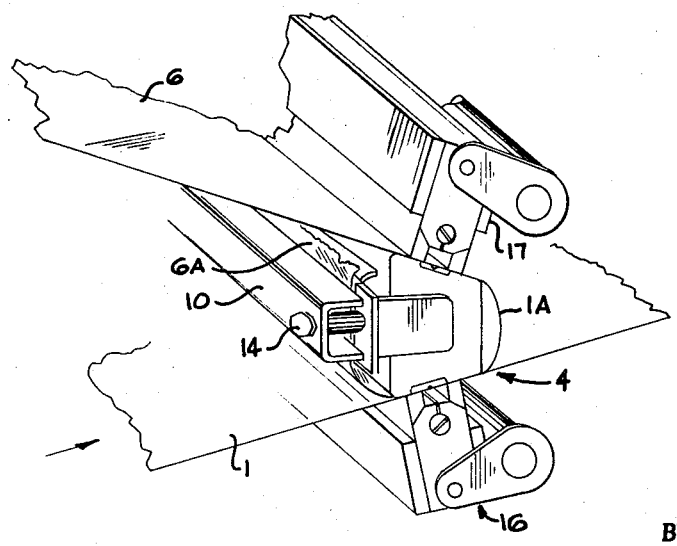
Figure 4:
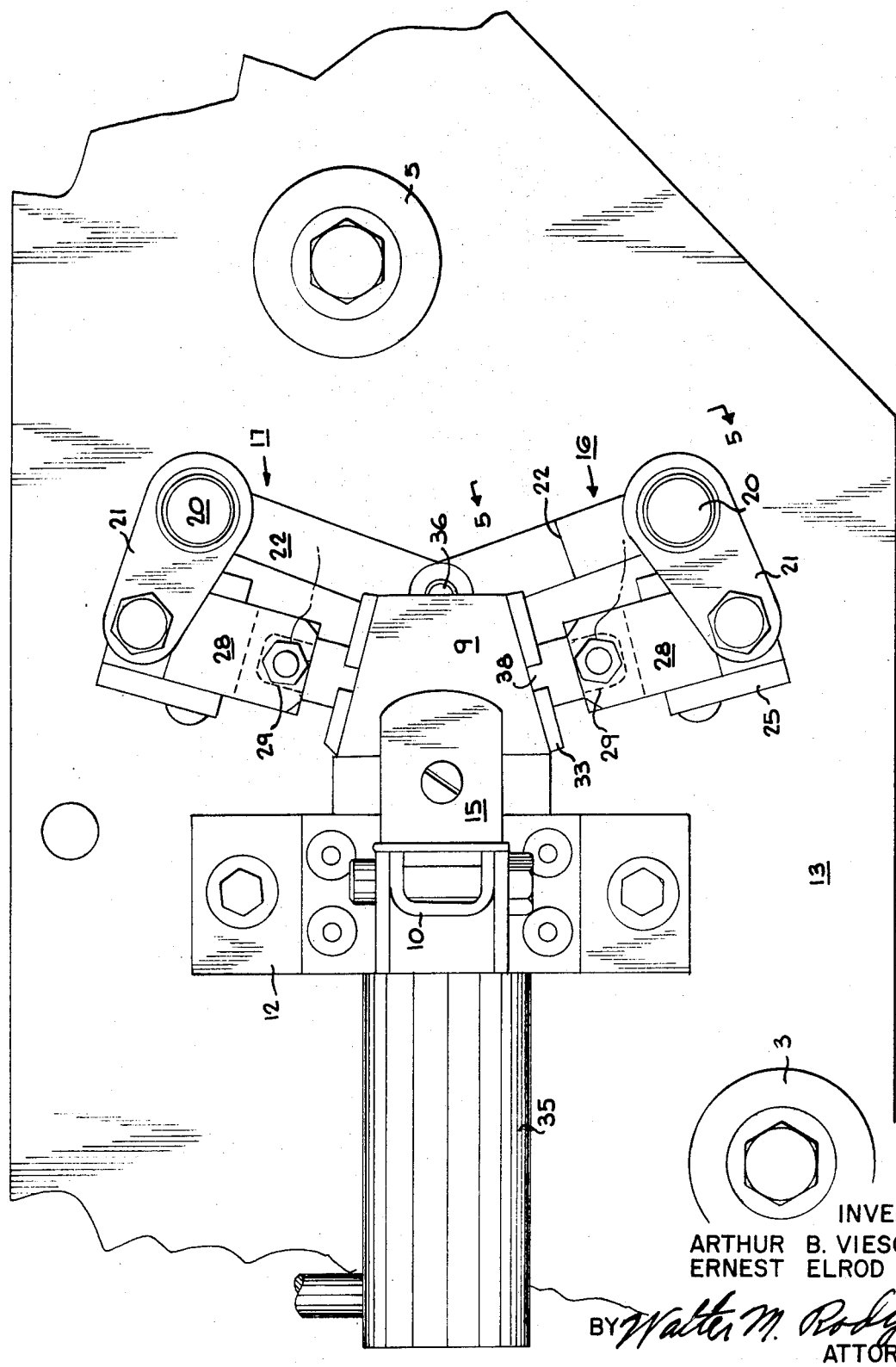

For a better understanding of the invention reference may be had to the following detailed description taken in conjunction with the accompanying drawings in which FIG. 1 is a perspective view of a splicer constructed according to the invention; FIG. 2 is a view similar to FIG. 1 and which shows one arrangement of supply and reserve strips; FIG. 3 is a view similar to FIG. 2 but which represents an alternative arrangement of reserve and supply strips from that depicted in FIG. 2; FIG. 4 is an enlarged side view of the splicing mechanism shown in FIGS. 1, 2 and 3 and which depicts the pressure bars and associated units in their open or non-splicing positions; FIG. 5 is a view taken along the line designated 5—5 in FIG. 4 and constitutes an end view of a portion of the splicer of FIG. 4; FIG. 6 is a view similar to FIG. 4 but taken from the opposite side of the splicer and which therefore shows certain elements not clearly observable in FIG. 4, the position of the parts being in the open or non-sealing position in FIG. 6.

With reference to FIG. 1 the numeral 1 denotes a supply strip being fed from a spool 2 around a guide roll 3 through the splicer mechanism generally designated by the numeral 4 and finally around guide roll 5 to a point of use.

In FIG. 1 a reserve strip designated by the numeral 6 is fed from a spool designated by the numeral 7 over guide roll 8 above and around mandrel 9. The leading end of reserve strip 6 is affixed to mandrel 9 by clamping bar 10. Clamping bar 10 is pivotally mounted at pivot 11 to support bar 12 which in turn is secured in a suitable manner to fixedly mounted base plate 13 which also constitutes mounting means for rolls 3, 5 and 8 as well as for mandrel 9. Clamping bar 10 is made of magnetic material and is affixed in its clamping position by suitable means such as the fixedly mounted holding magnet 15 as is obvious from FIGS. 1 and 4.

When the supply strip is exhausted and the trailing end thereof rides adjacent and over the guide roll 3, the packaging machine is shut down and the trailing end thereof is secured to the leading end of reserve strip 6 by the bonding means generally designated by the numeral 16. After the bond is made between the trailing end of supply strip 1 and the leading end of reserve strip 6 and the surplus ends of both strips are severed, the so-called reserve strip 6 then becomes the supply strip as indicated in FIG. 2. Thus from FIG. 2 it is apparent that the strip 6 indicated in dotted lines is being fed over guide roll 8 through the splicing device 4 and under guide roll 5 the splicer being depicted in its open or non-splicing position. Also from FIG. 2 it is apparent that the leading end of strip 1 is disposed underneath and to the right of the mandrel 9 and with the leading end 1A thereof clamped to the mandrel 9 by the clamping bar 10. When a bond is to be made between the trailing end of supply strip 6 and the leading or clamped end of reserve strip 1 as shown in FIG. 2, the bonding means generally designated by the numeral 17 is employed for that purpose.

FIG. 3 is a view similar to FIG. 1 and represents the case where strip 1 is the supply strip and wherein strip 6 is the reserve strip. Mandrel 9 is partially enveloped by the leading end 6A of reserve strip 6 and strip 1 is being fed to a point of use from its spool 2.

From the description thus far, it is apparent that according to the invention, a splicing device is provided with a common mandrel and with a pair of bonding devices which operate selectively to secure the trailing end of a depleted roll with the leading end of a reserve roll and to repeat the cycle in an alternate fashion. The splicer mechanism including the mandrel 9 and the bonding means 16 and 17 together with associated parts is shown in detail in FIGS. 4 and 5. As is apparent from FIGS. 4 and 5, bonding means 16 comprises a fixed pivot rod 20 which is securely affixed at its right hand end as shown in FIG. 5 to the base plate 13 together with a bell crank having arm 21 securely affixed to arm 22 in an L-shaped configuration and mounted as shown particularly in FIG. 4 for oscillatory motion about the fixed pivot 20. Yoke structure comprising arms 23 and 24 and strut 25 is affixed to the ends of arms 21 which are oscillatory about pivot 20. Secured to the arms 23 and 24 is the transverse supporting strut 25 on which are seated a pair of yieldable compressional springs 26 and 27. These compressional springs 26 and 27 yieldably support the pressure bar 28 which is provided with a transverse groove designated by the numeral 29 and which receives an elongated electrically energized heater wire element designated by the numeral 30. The heater element is mounted at its right end as viewed in FIG. 5 on contact 31 and at its left hand end on contact 32 supported by yoke structure 23. This heater element is energized by a conductor 32A which is energized from a suitable source not shown.

As is apparent in FIG. 5 the face 33 of mandrel 9 is spaced slightly from the pressure surface 34 of pressure bar 28.

In order to perform a bonding and severing operation on the trailing end of a supply strip and the leading end of a reserve strip, the pressure bar 28 is first moved upwardly into firm contact with the sealing surface 33 of mandrel 9. After movement of the pressure bar 28 is arrested due to engagement with the sealing surface 33 of mandrel 9, continued rotation of bell crank 21 causes the yoke elements 23 and 24 to continue to move toward the surface 33 of mandrel 9 due to the resilience of springs 26 and 27. When the heater wire 30 engages the film strip ends, a suitable bond is made and the ends severed in a manner well known in the art.

For the purpose of imparting operating motion to bell crank 21, yokes 23 and 24, as well as pressure bar 28 and electric heater element 30, the arm 22 of bell crank 16 must be moved to the right and in a clockwise direction about the fixed pivot 20. Toward this end suitable motive means such as that designated by the numeral 35 in FIG. 4 may be employed. Motive means 35 may constitute a cylinder and piston arrangement which is actuated by air under pressure in any suitable manner. For example, a piston disposed within the fluid motor 35 is movable toward the right and due to its connection by pin 36 with arms 22 imparts rotary motion in a clockwise direction as viewed in FIG. 4 about fixed pivot 20. Such motion causes the pressure bar 28 and the heater element 30 to move into engagement with the sealing surface 33 of mandrel 9 as already explained. During this operation, heater element 30 may move into the space designated by the numeral 38 on the surface 33 of mandrel 9. Of course motive means 35 is actuated by a suitable valve structure from a source of fluid pressure in a manner well known in the art but not depicted in detail in the drawings.

While the bonding means 16 has been described in detail, it is apparent particularly from FIG. 4 that the bonding means 17 is identical in structure and function to the bonding means 16 and a detailed description thereof is not deemed necessary.

The structure shown in FIG. 4, as pointed out above, is depicted in FIG. 6 from the opposite side thereof. From FIG. 6 it is apparent that in addition to arm 22 of the bell crank, a stabilizer bar 39 is pivotally connected by bolt 40 with crank arm 21 and is pivotally connected by pin 41 with plunger 42 which is operated by the fluid motor 35. An elongated lost motion slot 43 is formed in plunger 42 and receives the pin 41. Furthermore an elongated slot 44 is formed in stabilizer bar 39 and also receives the pin 41 and accommodates any lost motion between the parts. In like fashion slot 45 is formed in crank arm 22 and serves to accomommodate lost motion which may be desirable to facilitate proper operation of the parts.

As previously pointed out, operation of fluid motor 35 as shown in FIG. 6 causes plunger 42 to move to the left and causes crank arm 22 to rotate in a counter clockwise direction about fixed pivot 20 due to the motion to the left of plunger 42. This operation causes the bonding means generally designated by the numeral 16 to move upwardly as viewed in FIG. 6 and in a counterclockwise direction about the fixed pivot 20 until the pressure bar comes into contact with the bonding surface 33 of mandrel 9. Thereafter a sealing operation proceeds as explained above.

Of course such an operation is employed in connection with the arrangement depicted in FIGS. 1 and 3 wherein strip 1 constitutes the supply strip and wherein strip 6 constitutes the reserve strip. After the bond is made, the strip 6 becomes the supply strip following the taking up of any small amount of slack which may exist between the leading end of strip 6 and the trailing end of strip 1. The cutaway ends are removed and a fresh spool is mounted at spindle 2 and is then arranged as indicated in FIG. 2.

As pointed out above the structure and operation of bonding means 17 is identical to that of bonding means 16 and a detailed description thereof is not deemed necessary. Suffice it to say, the arrangement of FIG. 2 is converted to that depicted in FIGS. 1 and 3 by operation of the bonding means 17.

From the above description, it is apptrent that by the invention an efficient and compact splicing arrangement is provided which requires a minimum of attention and which is characterized by a high degree of reliability and which utilizes a minimum of space.

The embodiments of the invention in which an exclusive property or privilege is claimed are defined as follows:

1. A film splicing device comprising a fixed mandrel, a first film strip arranged to be fed alongside said mandrel to a point of use, a reserve film; strip extending from a reserve source of film strip along the opposite side of said mandrel and extending around said mandrel and with its end portion secured thereto in such manner that the leading end portion of said reserve film strip is interposed between said mandrel and said first film strip, and means for bonding the leading end of said reserve film strip to the trailing end of said first film strip and for severing the adjacent end portions of both of said strips.

2. A film splicing device comprising a mandrel, a first film strip arranged to be fed alongside said mandrel to a point of use, a reserve film strip extending from a reserve source of film strip along the opposite side of said mandrel and extending around said mandrel and with its end portion secured thereto in such manner that the leading end portion of said reserve film strip is interposed between said mandrel and said first film strip, and means for bonding the leading end of said reserve film strip to the trailing end of said first film strip and for severing the adjacent end portions of both of said strips, said means for bonding said strips together and for severing the end portions of said strips comprising a pressure bar and a heater element mounted adjacent said pressure bar and movable into contact with said strips after movement of said pressure bar into engagement with said strips and the forcing of said strips into close contact with said mandrel.

3. A film splicing device according to claim 2 wherein said pressure bar is yieldably mounted in a movable yoke and wherein said heater element is fixedly mounted on said yoke.

4. A film splicing device according to claim 2 wherein said pressure bar is formed with a groove therein adjacent said mandrel and wherein said heater element comprises an elongated heater element normally disposed within said groove.

5. A film splicing device according to claim 1 wherein the leading end of said reserve film strip is secured to said mandrel by a clamping element mounted said mandrel and arranged to urge said end of said reserve strip into snug engagement therewith.

6. A film splicing device according to claim 2 wherein said pressure bar and said heater element are mounted on a pivotally mounted bell crank and wherein motive means is arranged to swing said crank so that said pressure bar and said heater element are swung into engagement with said strips to perform a strip severing operation thereon.

7. A film splicing device according to claim 6 wherein a pair of pressure bars and their associated heater elements are disposed on generally opposite sides of said mandrel and are selectively operable to perform a film splicing and severing operation.

8. A film splicing device according to claim 7 wherein said pressure bars and heater elements are simultaneously moved into engagement with said strips and wherein said heater elements are selectively energized to perform a film splicing and severing operation adjacent only one of said pressure bars.

References Cited

UNITED STATES PATENTS

| | | | |
|---|---|---|---|
| 3,384,527 | 5/1968 | Fener | 156—515 X |
| 2,805,700 | 9/1957 | Klasing et al. | 156—515 |
| 3,489,628 | 1/1970 | Catzen | 156—504 X |
| 3,565,731 | 2/1971 | Schmermund | 156—504 |
| 3,089,661 | 5/1963 | Phillips, Jr., et al. | 156—504 X |
| 2,724,426 | 11/1955 | Bell et al. | 156—159 |
| 2,435,376 | 2/1948 | Wilcoxon | 156—504 |

PHILIP DIER, Primary Examiner

U.S. Cl. X.R.

156—507, 515, 159